No. 721,473. PATENTED FEB. 24, 1903.
E. C. SMITH.
BROADCAST HAND SEED SOWER.
APPLICATION FILED SEPT. 4, 1902.
NO MODEL. 2 SHEETS—SHEET 2.
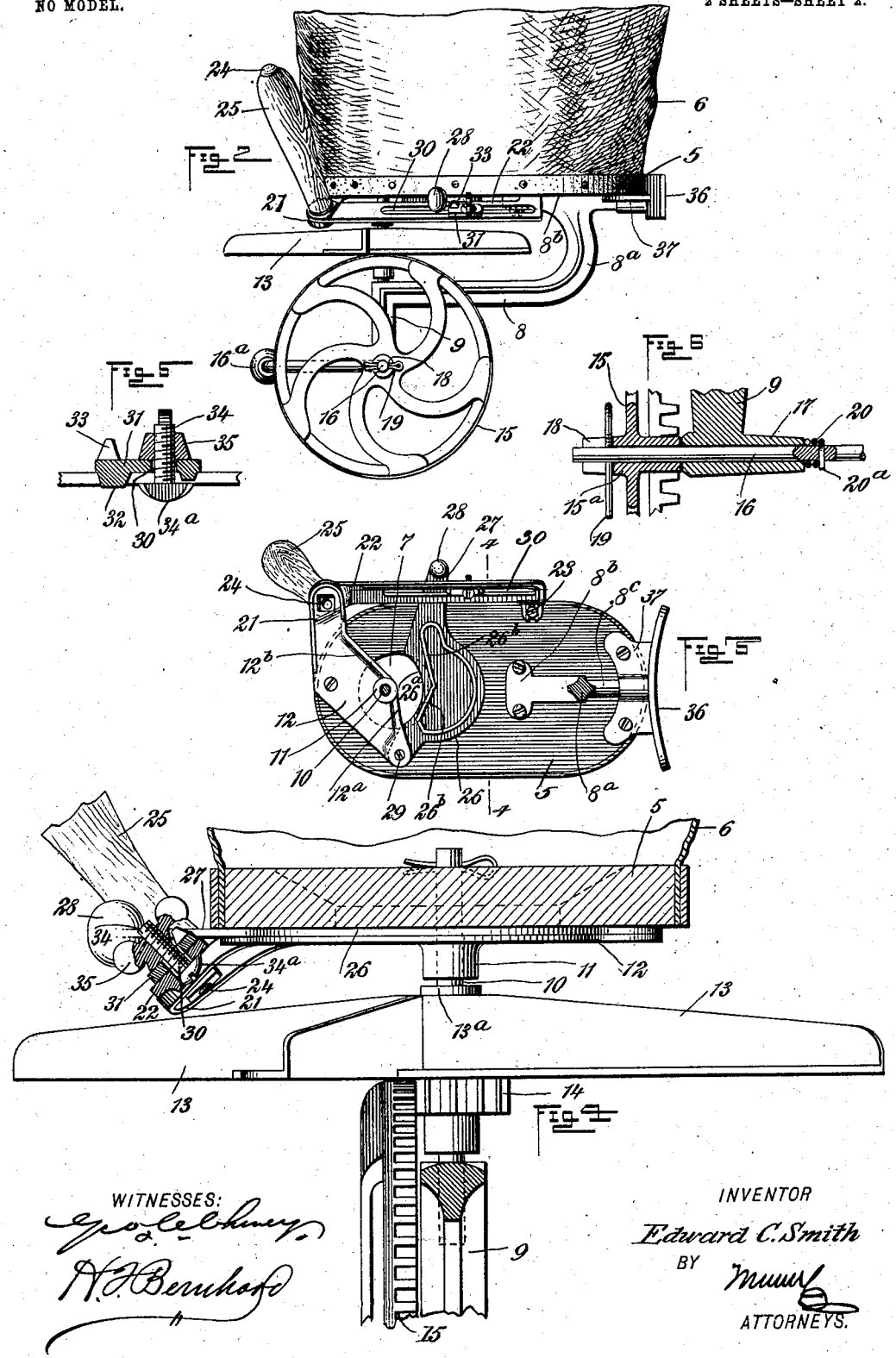
WITNESSES:
INVENTOR
Edward C. Smith
BY
ATTORNEYS.

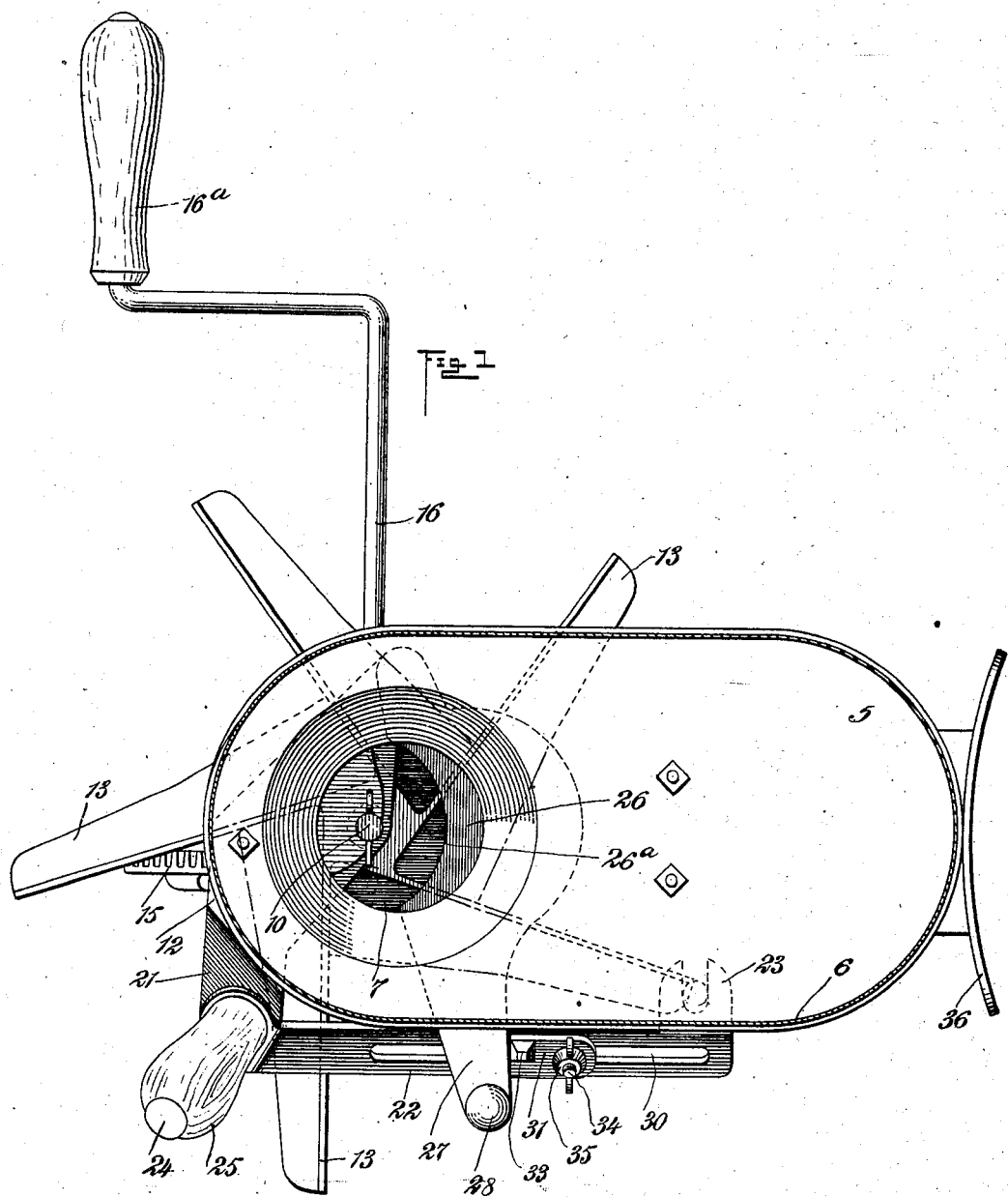

UNITED STATES PATENT OFFICE.

EDWARD CHARLES SMITH, OF ST. LOUIS, MISSOURI.

BROADCAST HAND SEED-SOWER.

SPECIFICATION forming part of Letters Patent No. 721,473, dated February 24, 1903.

Application filed September 4, 1902. Serial No. 122,097. (No model.)

*To all whom it may concern:*

Be it known that I, EDWARD CHARLES SMITH, a citizen of the United States, residing near St. Louis, in the State of Missouri, have invented a new and Improved Broadcast Hand Seed-Sower, of which the following is a full, clear, and exact description.

My invention relates to improvements in broadcast seed-sowers of that class which are intended to be carried on the person and operated by hand.

The objects of the present invention are, first, to provide the machine with a handle placed in a convenient position to be grasped by the hand in a natural manner and affording a means by which some of the weight of the machine and the load of seed may be lifted off the neck or shoulders of the operator; second, to arrange the base-plate and the gage-bar in a manner to securely hold the handle; third, to provide a base-plate partially covering the seed-opening and supporting some of the operating parts; fourth, to provide a gate adjustable to variable positions to regulate the quantity of different kinds of seeds, which may be discharged broadcast over the ground; fifth, to provide an adjustable gage-stop to determine the adjustment of the seed-gate; sixth, to arrange the gage-bar in frictional engagement with the seed-plate and restrain the latter from accidental movement after it shall have been placed in position, and, finally, to improve the machine in minor details, so as to simplify and cheapen its construction and increase the efficiency of operation.

With these ends in view the invention consists in the novel construction, arrangement, and combination of parts, which will be hereinafter fully described and claimed.

Reference is to be had to the accompanying drawings, forming a part of this specification, in which similar characters of reference indicate corresponding parts in all the figures.

Figure 1 is a sectional plan view of a hand seed-sower embodying my improvements, the section being taken horizontally through the seed bag or hopper. Fig. 2 is an elevation, on a reduced scale, of the improved seed-sower, the upper part of the seed bag or hopper being broken. Fig. 3 is an inverted sectional plan view, the plane of the section being taken above the seed-distributing wheel and through the arched part of the supporting-bracket. Fig. 4 is a vertical detail sectional view on an enlarged scale and taken in the plane of the dotted line 4 4 of Fig. 3, and Figs. 5 and 6 are detail sectional views of parts of the improvement.

5 designates the base, and 6 is the seed bag or hopper, which is fastened to the edge portion of the base in any suitable way. In the base 5 is provided a seed-opening 7, and to the under side of the base is secured one end of the supporting-bracket 8, the latter having a curved arm $8^a$, which is enlarged to form the plate $8^b$, secured by screws or bolts in any suitable way to the base 5. The supporting-bracket is provided at its free end with a depending bar 9, in the upper end of which is journaled a vertical shaft 10, the upper end of said shaft being confined in a boss 11, which is made integral with a base-plate 12, the latter being secured directly to the base 5, as shown by Fig. 4. The seed-distributing wheel 13 is provided with a hub $13^a$, rigidly mounted on the shaft 10, and this hub is provided on its under side with an integral gear 14, the latter having intermeshing engagement with a master-gear 15. The said master-gear is made fast with a crank-shaft 16, having a suitable handle $16^a$, and this crank-shaft is journaled in a horizontal bearing 17, which is provided at the lower extremity of the arm 9, forming a part of the bracket 8.

The master-gear 15 is provided with a hub $15^a$, one end of which is formed with a transverse notch 18, as shown by Figs. 2 and 6, and in this notch is fitted a cotter or spring-key 19, the latter passing through a suitable perforation in the shaft 16 and engaging with the notched end of the hub $15^a$ for the purpose of making the gear 15 fast with the crank-shaft. The hub of the master-gear is arranged to impinge or ride against one end of the horizontal bearing 17, so as to restrain the crank-shaft from endwise movement in one direction in the bearing, and this shaft is prevented from moving endwise in an opposite direction by means of a collar 20. As shown by Fig. 6, the collar 20 is formed by a wire which is coiled around the shaft 16 and has one end $20^a$ thrust or passed entirely through an opening in and projecting beyond said shaft sufficiently to support itself on the shaft, said collar 20 being arranged to impinge against the opposite end of the shaft-bearing 17.

The seed-distributing wheel 13 may be of any suitable construction; but, as shown by Figs. 1 and 4, it is provided with a series of arms which are flanged to receive the seed discharged from the hopper and to throw the seed on radial lines when the wheel is rapidly rotated by the gearing which connects the distributing-wheel with the crank-shaft 16. This distributing-wheel is disposed immediately below the opening 7 in the base 5.

The base-plate 12 is cast in a single piece of metal with converging edges $12^a$ $12^b$, which meet at about the center of the opening 7. The base-plate is furthermore provided with an integral arm 21, which is inclined at an angle to the plane of the plate, said inclined arm extending beyond one edge of the base 5. (See Figs. 3 and 4.)

22 designates a gage-bar which is arranged at one side of the base 5, said bar being provided at one end with a slotted integral lug 23, which is securely fastened to the base 5, the other end of said gage-bar being disposed in overlapping relation to the angular arm 21 of the base-plate. The gage-bar and the arm of the base-plate are firmly joined together by a bolt 24, which serves to attach the handle 25 to the connected ends of the base-plate and the gage-bar. (See Figs. 1, 2, and 3.) This handle is supported in a fixed position at one corner of the seed-sower, and it lies at an angle to the base 5, thus making the handle assume a position where it may be conveniently grasped by the hand in a natural manner. The handle provides a means whereby the operator may partly carry the machine and relieve the neck or shoulders of the operator from some of the weight of the machine and the load of seed, the hopper, as usual, being provided with a shoulder-strap. (Not shown.)

26 designates a seed-gate, the same being cast in a single piece of metal and arranged in a horizontal position on the under side of the base 5. This seed-gate is provided in one edge with a curved recess $26^a$, arranged to fit over the inner beveled edges $12^a$ $12^b$ of the base-plate, and said seed-gate is furthermore provided with inclined flanges $26^b$, adapted to register with the inclined edges of the base-plate, whereby the seed-gate may be closed across the opening 7, and it may fit close to the base-plate in order to prevent the seed from escaping through said opening 7. The seed-gate is also provided with an arm 27, which extends between the base 5 and the edge of the gage-bar 22, said arm 27 having a knob or finger-piece 28. The gage-bar 22 is attached to the base and to the base-plate in a manner to engage frictionally with the arm 27 of the seed-gate, and this frictional engagement is sufficient to prevent the gate from moving accidentally and thereby opening the seed-passage 7. The seed-gate is pivoted to the base 5 by a screw 29 or its equivalent.

The gage-bar 22 is provided with a longitudinal slot 30, and against this bar is applied a gage-slide 31. (Shown more clearly by Figs. 1, 4, and 5.) This slide is provided on one face with a rib 32, which fits in the slot 30, and on the other face of the slide is a stop-lug 33, the latter being disposed in the path of the arm 27 of the pivoted seed-gate. The slide may be adjusted to different positions on the slotted gage-bar, and it is provided with a bolt 34, adapted to pass through the slot 30 and having a head $34^a$, which bears against one side of the gage-bar, the other end of said bolt being provided with a winged thumb-nut 35.

36 designates a breastplate which is provided with a web 37, arranged to embrace the stem $8^c$ of the supporting-bracket 8, said web being fastened to the under side of the base 5 and serving in a measure to secure the supporting-bracket firmly to said base.

Having thus described my invention, I claim as new and desire to secure by Letters Patent—

1. A broadcast seed-sower, comprising a hopper, a distributing mechanism, a seed-gate, a base-plate fastened to the hopper-base, and a gage-bar attached to the base-plate and engaging frictionally with said seed-gate.

2. A broadcast seed-sower, comprising a hopper, a base-plate, a gage-bar fastened to the base-plate and to the hopper-bottom, a seed-gate, and a handle secured firmly to the base-plate and the gage-bar.

3. A broadcast seed-sower, comprising a hopper, a distributing mechanism, a base-plate fastened to the base of the hopper and having an inclined arm, a gage-bar disposed in overlapping relation to the inclined arm, a seed-gate, and a handle fastened to the base-plate and the gage-bar at their point of overlap and disposed at an angle to the base of the hopper.

4. A broadcast seed-sower, comprising a hopper, a base-plate fastened to the hopper-bottom and having an inclined arm at one end, a gage-bar fastened at one end to the hopper-bottom and having its other end lapping the inclined arm of the base-plate, an inclined handle secured to the lapping end of the gage-bar and said arm of the base-plate, a gate slidably guided by the gage-bar, and a stop clamped to the gage-bar in the path of the gate.

5. A broadcast seed-sower, comprising a hopper, a supporting-bracket having a shaft-bearing, a crank-shaft in said bearing, a master-gear provided with a notched hub and fitted to said shaft, a cotter attached to the shaft and engaging with the notched hub of the said master-gear, a collar fastened to the crank-shaft and formed by a wire coil arranged to engage with one end of the shaft-bearing, and a distributing-wheel disposed below a seed-opening in the hopper and geared to the master-gear.

6. A broadcast seed-sower having a hopper, a pivoted seed-gate provided with an arm, a gage-bar supported in an inclined position on the hopper and engaging frictionally with said arm of the seed-gate, and a gage-slide clamped adjustably to the gage-bar and disposed in the path of said arm on the seed-gate.

In testimony whereof I have signed my name to this specification in the presence of two subscribing witnesses.

EDWARD CHARLES SMITH.

Witnesses:
  FRED H. REID,
  J. B. POLLARD.